(12) United States Patent
Biskeborn

(10) Patent No.: US 10,832,713 B2
(45) Date of Patent: Nov. 10, 2020

(54) MULTICHANNEL TAPE RECORDING DEVICE HAVING CALIBRATED SPAN OF TRANSDUCERS

(71) Applicant: International Business Machines Corporation, Armonk, NY (US)

(72) Inventor: Robert G. Biskeborn, Hollister, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/203,380

(22) Filed: Nov. 28, 2018

(65) Prior Publication Data

US 2020/0168245 A1    May 28, 2020

(51) Int. Cl.
| | |
|---|---|
| G11B 5/58 | (2006.01) |
| G11B 5/584 | (2006.01) |
| G11B 7/24009 | (2013.01) |
| G11B 27/24 | (2006.01) |
| G11B 20/12 | (2006.01) |
| G11B 27/10 | (2006.01) |

(52) U.S. Cl.
CPC .......... *G11B 5/584* (2013.01); *G11B 7/24009* (2013.01); *G11B 20/1202* (2013.01); *G11B 27/107* (2013.01); *G11B 27/24* (2013.01); *G11B 2220/93* (2013.01)

(58) Field of Classification Search
CPC .. G11B 5/584; G11B 7/24009; G11B 2220/93
USPC ....................................................... 360/121
See application file for complete search history.

(56) References Cited

U.S. PATENT DOCUMENTS

| | | | |
|---|---|---|---|
| 5,629,813 A | 5/1997 | Baca et al. | |
| 5,675,448 A | 10/1997 | Molstad et al. | |
| 5,819,309 A | 10/1998 | Gray | |
| 6,493,174 B1 * | 12/2002 | Stubbs ................... | G11B 5/584 360/77.12 |
| 6,612,499 B2 | 9/2003 | Ellis et al. | |
| 6,833,973 B2 | 12/2004 | Chliwnyj et al. | |
| 6,903,895 B2 | 6/2005 | Chliwnyj et al. | |
| 6,992,857 B2 | 1/2006 | Knowles et al. | |
| 7,158,339 B2 | 1/2007 | Kuse et al. | |
| 7,280,307 B2 | 10/2007 | Bui et al. | |

(Continued)

FOREIGN PATENT DOCUMENTS

EP            616319 A2     9/1994

OTHER PUBLICATIONS

Biskeborn et al., U.S. Appl. No. 15/986,674, filed May 22, 2018.

*Primary Examiner* — Allen T Cao
(74) *Attorney, Agent, or Firm* — Zilka-Kotab, P.C.

(57) ABSTRACT

An apparatus according to one approach includes a module having an array of transducers having at least two transducers. The apparatus also includes a persistent memory having stored therein data of a span of the array of transducers at a particular temperature. An apparatus according to another approach includes a module having fiducials at known positions relative to an array of transducers. The apparatus also includes a persistent memory having stored therein data of a span between the fiducials at a particular temperature. The fiducial span may be used in conjunction with the known locations of the fiducials relative to the array to characterize the span of the array.

25 Claims, 11 Drawing Sheets

(56) References Cited

U.S. PATENT DOCUMENTS

| | | | |
|---|---|---|---|
| 7,330,417 B2 * | 2/2008 | Billau | G11B 20/1217 360/48 |
| 7,391,587 B2 | 6/2008 | Dugas et al. | |
| 8,154,811 B2 | 4/2012 | Barsotti et al. | |
| 8,264,789 B2 | 9/2012 | Kawakami et al. | |
| 8,526,135 B2 | 9/2013 | Ohtsu et al. | |
| 8,687,313 B2 * | 4/2014 | Selvaraj | G11B 5/6029 360/75 |
| 8,773,795 B1 * | 7/2014 | Biskeborn | G11B 5/00878 360/48 |
| 8,824,083 B1 | 9/2014 | Kientz et al. | |
| 9,153,279 B1 | 10/2015 | Hikita | |
| 9,361,921 B2 | 6/2016 | Herget | |
| 9,621,201 B1 * | 4/2017 | Peric | H04B 1/0475 |
| 9,640,208 B2 | 5/2017 | Poorman et al. | |
| 10,008,230 B1 * | 6/2018 | Ozawa | G11B 5/71 |
| 10,332,547 B1 * | 6/2019 | Erden | G11B 5/012 |
| 10,475,477 B1 * | 11/2019 | Biskeborn | G11B 5/00813 |
| 2005/0018341 A1 * | 1/2005 | Brume | G11B 15/689 360/69 |
| 2006/0007722 A1 * | 1/2006 | Nordal | G11C 29/02 365/65 |
| 2006/0072235 A1 * | 4/2006 | Kuse | G11B 15/26 360/71 |
| 2006/0092547 A1 * | 5/2006 | Kawakami | G11B 5/584 360/71 |
| 2006/0285240 A1 | 12/2006 | Jurneke | |
| 2007/0268613 A1 * | 11/2007 | Fitzpatrick | G11B 5/02 360/75 |
| 2008/0002278 A1 * | 1/2008 | Ueda | G11B 5/59633 360/75 |
| 2009/0174964 A1 * | 7/2009 | Cherubini | G11B 5/584 360/77.12 |
| 2009/0185309 A1 * | 7/2009 | Bates | G11B 5/41 360/97.12 |
| 2011/0141868 A1 | 6/2011 | Mahnad | |
| 2012/0307401 A1 * | 12/2012 | Bui | G11B 5/584 360/77.12 |
| 2012/0327533 A1 * | 12/2012 | Selvaraj | G11B 5/6029 360/77.02 |
| 2014/0070753 A1 * | 3/2014 | Concannon | G01M 15/04 318/671 |
| 2014/0334033 A1 * | 11/2014 | Biskeborn | G11B 5/56 360/76 |
| 2015/0092294 A1 * | 4/2015 | Cherubini | G11B 5/00826 360/63 |
| 2016/0179417 A1 | 6/2016 | Fasen et al. | |
| 2018/0374506 A1 * | 12/2018 | Kasada | G11B 5/735 |
| 2019/0103135 A1 * | 4/2019 | Ozawa | G11B 5/78 |

* cited by examiner

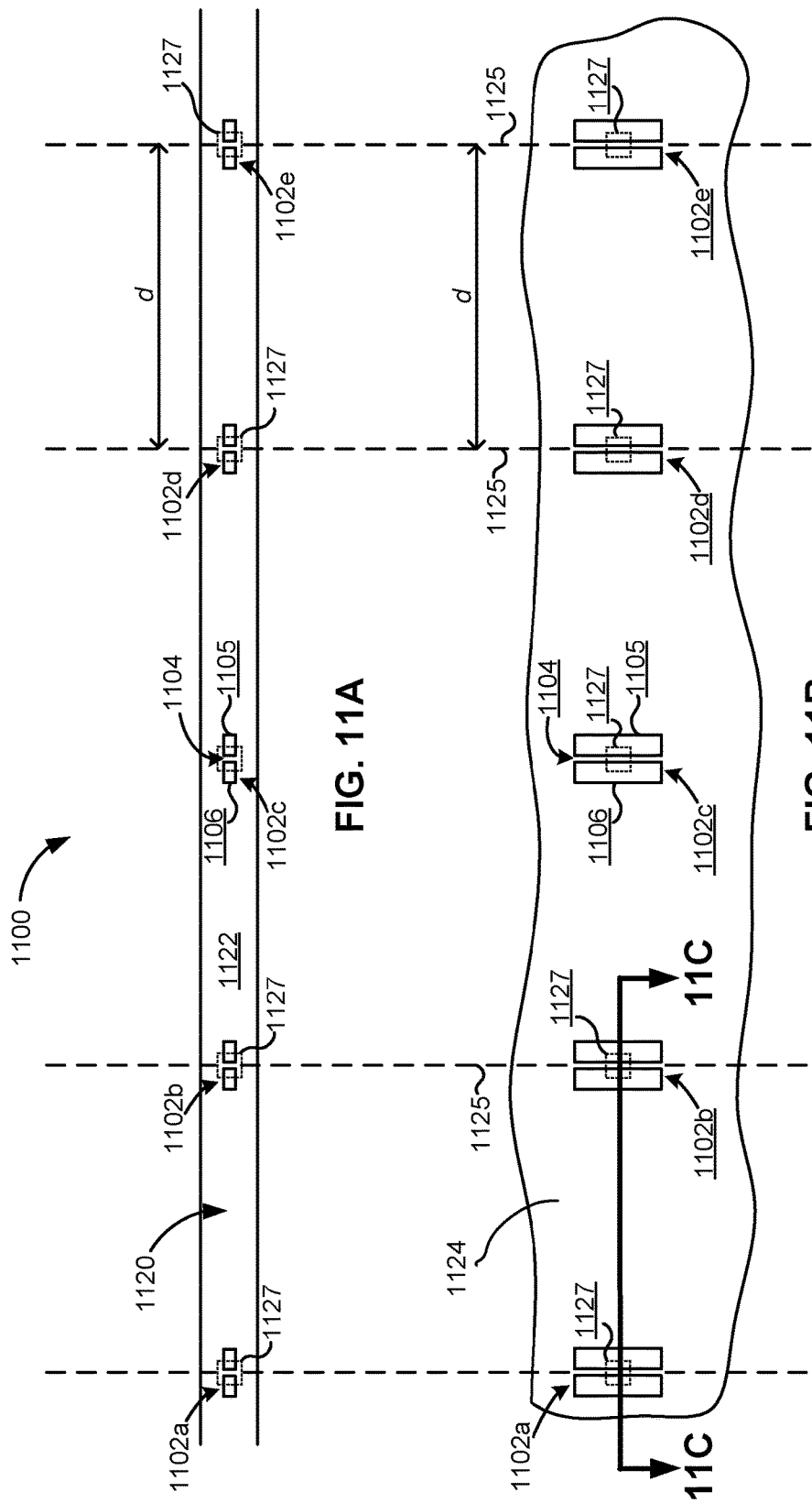

MULTICHANNEL TAPE RECORDING DEVICE HAVING CALIBRATED SPAN OF TRANSDUCERS

BACKGROUND

The present invention relates to data storage systems, and more particularly, to a multichannel tape recording device having a calibrated span of transducers.

In magnetic storage systems, magnetic transducers read data from and write data onto magnetic recording media. Data is written on the magnetic recording media by moving a magnetic recording transducer to a position over the media where the data is to be stored. The magnetic recording transducer then generates a magnetic field, which encodes the data into the magnetic media. Data is read from the media by similarly positioning the magnetic read transducer and then sensing the magnetic field of the magnetic media. Read and write operations may be independently synchronized with the movement of the media to ensure that the data can be read from and written to the desired location on the media.

An important and continuing goal in the data storage industry is that of increasing the density of data stored on a medium. For tape storage systems, that goal has led to increasing the track and linear bit density on recording tape, and decreasing the thickness of the magnetic tape medium. However, the development of small footprint, higher performance tape drive systems has created various challenges ranging from the design of tape head assemblies for use in such systems to dealing with misregistration due to tape dimensional instability.

SUMMARY

An apparatus according to one approach includes a module having an array of transducers having at least two transducers. The apparatus also includes a persistent memory having stored therein data of a span of the array of transducers at a particular temperature.

Where the apparatus is a tape drive, the span data stored in the tape drive memory enables screening, quality tracking, tape initialization, and/or other performance attributes of the modules and/or tape run on the modules. The particular temperature provides a reference characteristic of the state of thermal expansion of the module.

An apparatus according to another approach includes a plurality of modules, each module having an array of transducers. Each array has at least two transducers. The apparatus also includes a persistent memory having stored therein data of spans of the arrays of transducers at a particular temperature.

As above, where the apparatus is a tape drive, the span data stored in the tape drive memory enables screening, quality tracking, tape initialization, and/or other performance attributes of the modules and/or tape run on the modules.

An apparatus according to yet another approach includes a module having fiducials at known positions relative to an array of transducers. The apparatus also includes a persistent memory having stored therein data of a span between the fiducials at a particular temperature. The fiducial span may be used in conjunction with the known locations of the fiducials relative to the array to characterize the span of the array.

Any of these embodiments may be implemented in a magnetic data storage apparatus such as a tape drive system, which may include a magnetic head, a drive mechanism for passing a magnetic medium (e.g., recording tape) over the magnetic head, and a controller electrically coupled to the magnetic head.

Other aspects and embodiments of the present disclosure will become apparent from the following detailed description, which, when taken in conjunction with the drawings, illustrate by way of example the principles of the disclosure.

BRIEF DESCRIPTION OF DRAWINGS

FIGS. 11A-11C depict an apparatus having dedicated features for enabling measurement of a span between the features, in accordance with various approaches.

DETAILED DESCRIPTION

The following description is made for the purpose of illustrating the general principles of the present disclosure and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of magnetic storage systems, as well as operation and/or component parts thereof.

An apparatus according to one approach includes a module having an array of transducers having at least two transducers. The apparatus also includes a persistent memory having stored therein data of a span of the array of transducers at a particular temperature.

An apparatus according to another approach includes a plurality of modules, each module having an array of transducers. Each array has at least two transducers. The apparatus also includes a persistent memory having stored therein data of spans of the arrays of transducers at a particular temperature.

An apparatus according to yet another approach includes a module having fiducials at known positions relative to an array of transducers. The apparatus also includes a persistent memory having stored therein data of a span between the fiducials at a particular temperature. The fiducial span may be used in conjunction with the known locations of the fiducials relative to the array to characterize the span of the array.

Figure 1A:
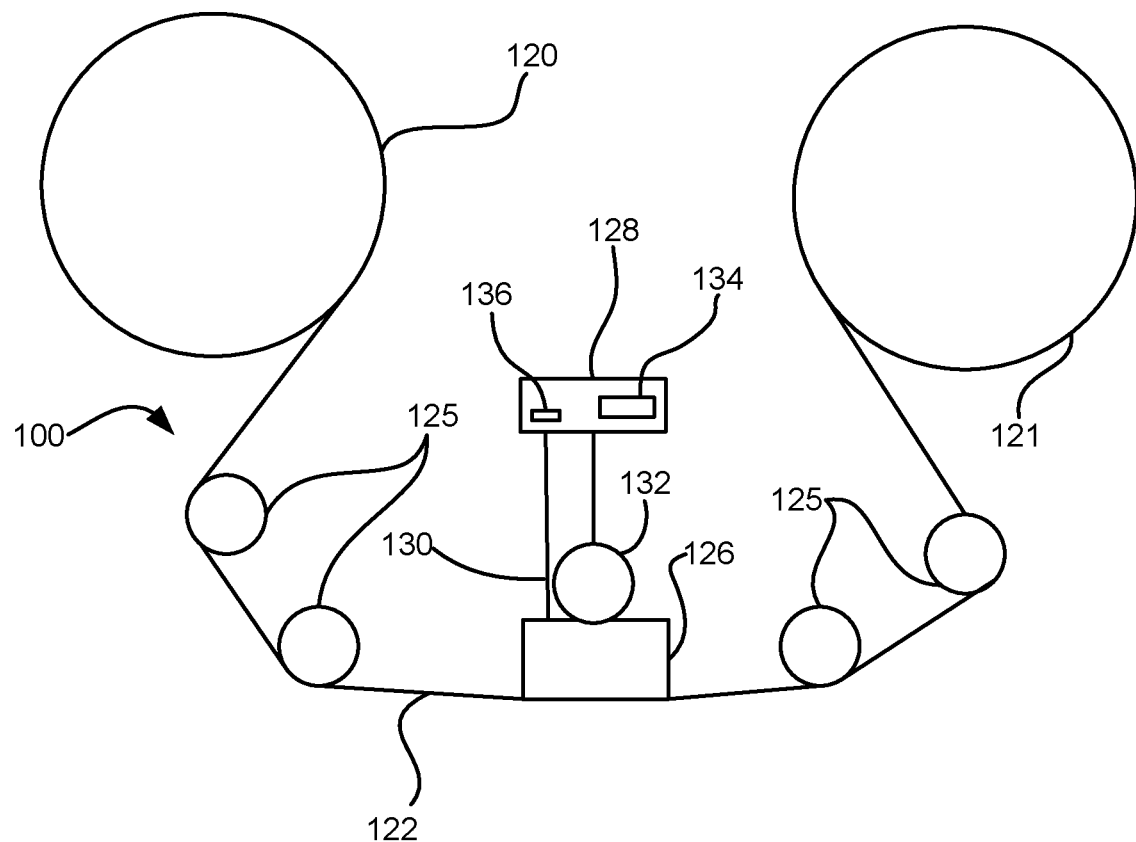
FIG. 1A is a schematic diagram of a simplified tape drive system according to one embodiment.

FIG. 1A illustrates a simplified tape drive 100 of a tape-based data storage system, which may be employed in the context of the present disclosure. While one specific implementation of a tape drive is shown in FIG. 1A, it should be noted that the embodiments described herein may be implemented in the context of any type of tape drive system.

As shown, a tape supply cartridge 120 and a take-up reel 121 are provided to support a tape 122. One or more of the reels may form part of a removable cartridge and are not necessarily part of the tape drive 100. The tape drive, such as that illustrated in FIG. 1A, may further include drive motor(s) to drive the tape supply cartridge 120 and the take-up reel 121 to move the tape 122 over a tape head 126 of any type. Such head may include an array of readers, writers, or both.

Guides 125 guide the tape 122 across the tape head 126. Such tape head 126 is in turn coupled to a controller 128 via a cable 130. The controller 128, may be or include a processor and/or any logic for controlling any subsystem of the drive 100. For example, the controller 128 typically controls head functions such as servo following, data writing, data reading, etc. The controller 128 may include at least one servo channel and at least one data channel, each of which include data flow processing logic configured to process and/or store information to be written to and/or read from the tape 122. The controller 128 may operate under logic known in the art, as well as any logic disclosed herein, and thus may be considered as a processor for any of the descriptions of tape drives included herein, in various embodiments. The controller 128 may be coupled to a memory 136 of any known type, which may store instructions executable by the controller 128. Moreover, the controller 128 may be configured and/or programmable to perform or control some or all of the methodology presented herein. Thus, the controller 128 may be considered to be configured to perform various operations by way of logic programmed into one or more chips, modules, and/or blocks; software, firmware, and/or other instructions being available to one or more processors; etc., and combinations thereof.

The cable 130 may include read/write circuits to transmit data to the tape head 126 to be recorded on the tape 122 and to receive data read by the tape head 126 from the tape 122. An actuator 132 controls position of the tape head 126 relative to the tape 122.

An interface 134 may also be provided for communication between the tape drive 100 and a host (internal or external) to send and receive the data and for controlling the operation of the tape drive 100 and communicating the status of the tape drive 100 to the host, all as will be understood by those of skill in the art.

Figure 1B:
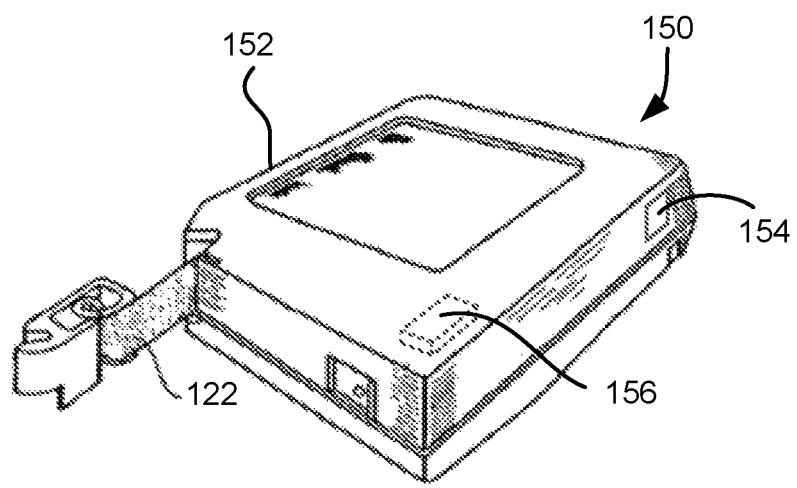
FIG. 1B is a schematic diagram of a tape cartridge according to one embodiment.

FIG. 1B illustrates an exemplary tape cartridge 150 according to one embodiment. Such tape cartridge 150 may be used with a system such as that shown in FIG. 1A. As shown, the tape cartridge 150 includes a housing 152, a tape 122 in the housing 152, and a nonvolatile memory 156 coupled to the housing 152. In some approaches, the nonvolatile memory 156 may be embedded inside the housing 152, as shown in FIG. 1B. In more approaches, the nonvolatile memory 156 may be attached to the inside or outside of the housing 152 without modification of the housing 152. For example, the nonvolatile memory may be embedded in a self-adhesive label 154. In one preferred embodiment, the nonvolatile memory 156 may be a Flash memory device, read-only memory (ROM) device, etc., embedded into or coupled to the inside or outside of the tape cartridge 150. The nonvolatile memory is accessible by the tape drive and the tape operating software (the driver software), and/or another device.

Figure 2A:
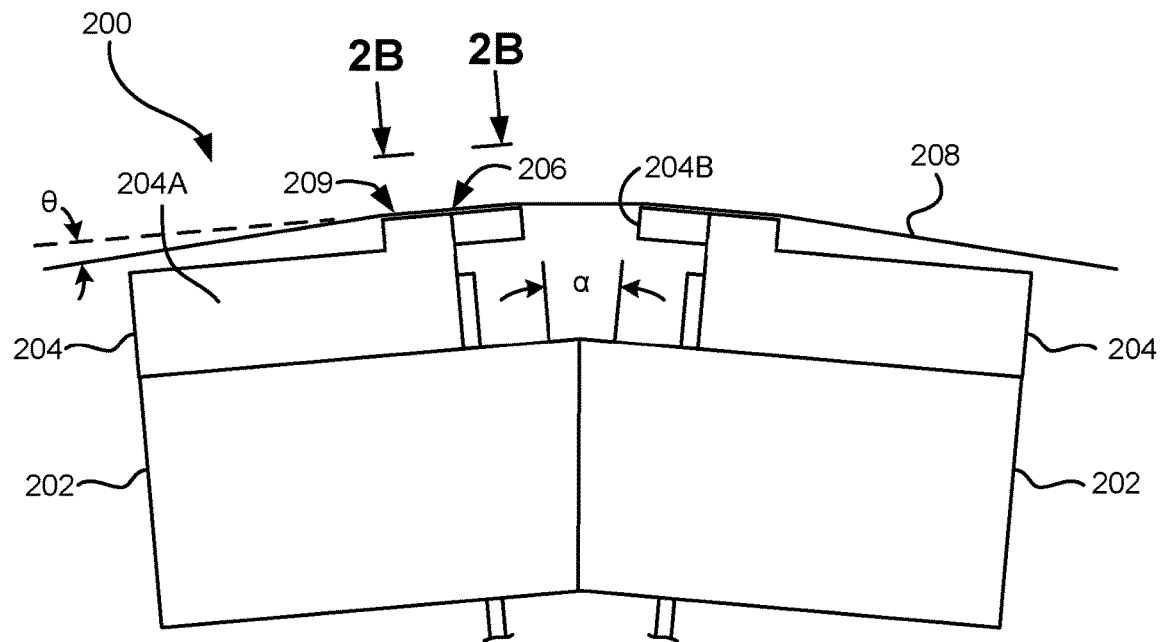
FIG. 2A illustrates a side view of a flat-lapped, bi-directional, two-module magnetic tape head according to one embodiment.

By way of example, FIG. 2A illustrates a side view of a flat-lapped, bi-directional, two-module magnetic tape head 200 which may be implemented in the context of the present disclosure. As shown, the head includes a pair of bases 202, each equipped with a module 204, and fixed at a small angle α with respect to each other. The bases may be "U-beams" that are adhesively coupled together. Each module 204 includes a substrate 204A and a closure 204B with a thin film portion, commonly referred to as a "gap" in which the readers and/or writers 206 are formed. In use, a tape 208 is moved over the modules 204 along a media (tape) bearing surface 209 in the manner shown for reading and writing data on the tape 208 using the readers and writers. The wrap angle θ of the tape 208 at edges going onto and exiting the flat media support surfaces 209 are usually between about 0.1 degree and about 3 degrees.

The substrates 204A are typically constructed of a wear resistant material, such as a ceramic. The closures 204B may be made of the same or similar ceramic as the substrates 204A.

The readers and writers may be arranged in a piggyback or merged configuration. An illustrative piggybacked configuration comprises a (magnetically inductive) writer transducer on top of (or below) a (magnetically shielded) reader transducer (e.g., a magnetoresistive reader, etc.), wherein the poles of the writer and the shields of the reader are generally separated. An illustrative merged configuration comprises one reader shield in the same physical layer as one writer pole (hence, "merged"). The readers and writers may also be arranged in an interleaved configuration. Alternatively, each array of channels may be readers or writers only. Any of these arrays may contain one or more servo track readers for reading servo data on the medium.

Figure 2B:
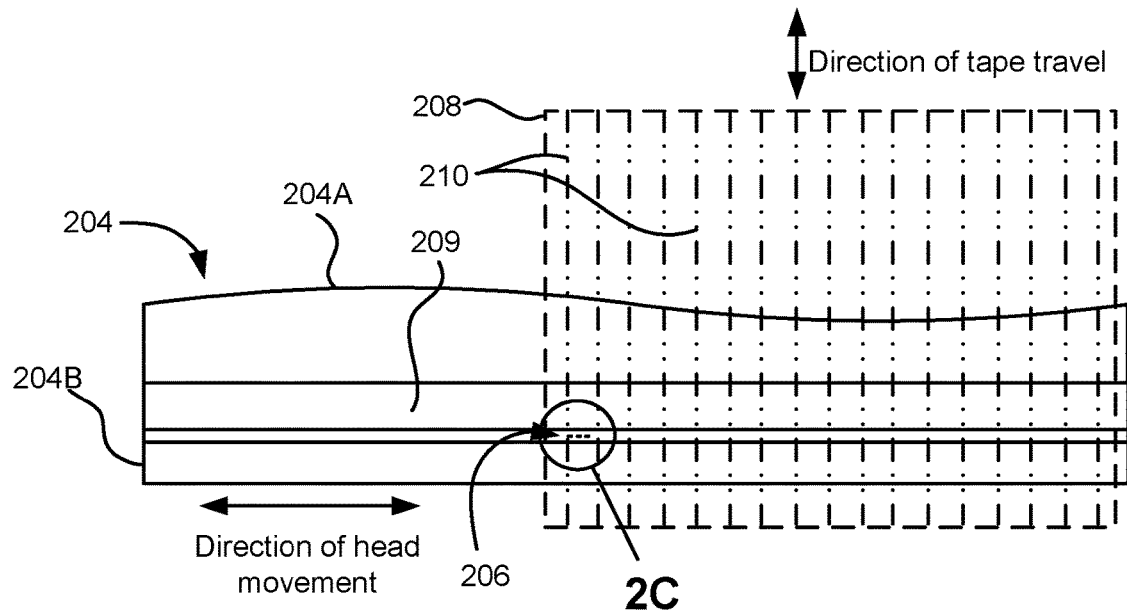
FIG. 2B is a tape bearing surface view taken from Line 2B of FIG. 2A.

FIG. 2B illustrates the tape bearing surface 209 of one of the modules 204 taken from Line 2B of FIG. 2A. A representative tape 208 is shown in dashed lines. The module 204 is preferably long enough to be able to support the tape as the head steps between data bands.

In this example, the tape 208 includes 4 to 32 data bands, e.g., with 16 data bands and 17 servo tracks 210, as shown in FIG. 2B on a one-half inch wide tape 208. The data bands are defined between servo tracks 210. Each data band may include a number of data tracks, for example 1024 data tracks (not shown). During read/write operations, the readers and/or writers 206 are positioned to specific track positions within one of the data bands. Outer readers, sometimes called servo readers, read the servo tracks 210. The servo signals are in turn used to keep the readers and/or writers 206 aligned with a particular set of tracks during the read/write operations.

Figure 2C:
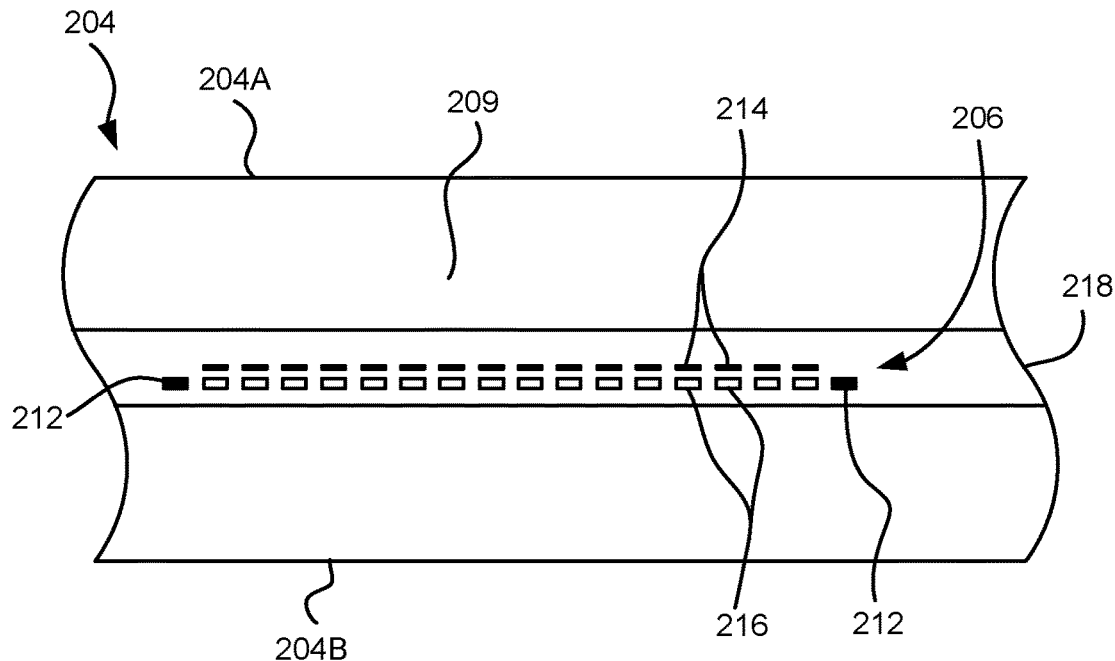
FIG. 2C is a detailed view taken from Circle 2C of FIG. 2B.

FIG. 2C depicts a plurality of readers and/or writers 206 formed in a gap 218 on the module 204 in Circle 2C of FIG. 2B. As shown, the array of readers and writers 206 includes, for example, 16 writers 214, 16 readers 216 and two servo readers 212, though the number of elements may vary. Illustrative embodiments include 8, 16, 32, 40, and 64 active readers and/or writers 206 per array, and alternatively interleaved designs having odd numbers of reader or writers such as 17, 25, 33, etc. An illustrative embodiment includes 32 readers per array and/or 32 writers per array, where the actual number of transducer elements could be greater, e.g., 33, 34, etc. This allows the tape to travel more slowly, thereby reducing speed-induced tracking and mechanical difficulties and/or execute fewer "wraps" to fill or read the tape. While the readers and writers may be arranged in a piggyback configuration as shown in FIG. 2C, the readers 216 and writers 214 may also be arranged in an interleaved configuration. Alternatively, each array of readers and/or writers 206 may be readers or writers only, and the arrays may contain one or more servo readers 212. As noted by considering FIGS. 2A and 2B-2C together, each module 204 may include a complementary set of readers and/or writers 206 for such things as bi-directional reading and writing, read-while-write capability, backward compatibility, etc.

Figure 2D:
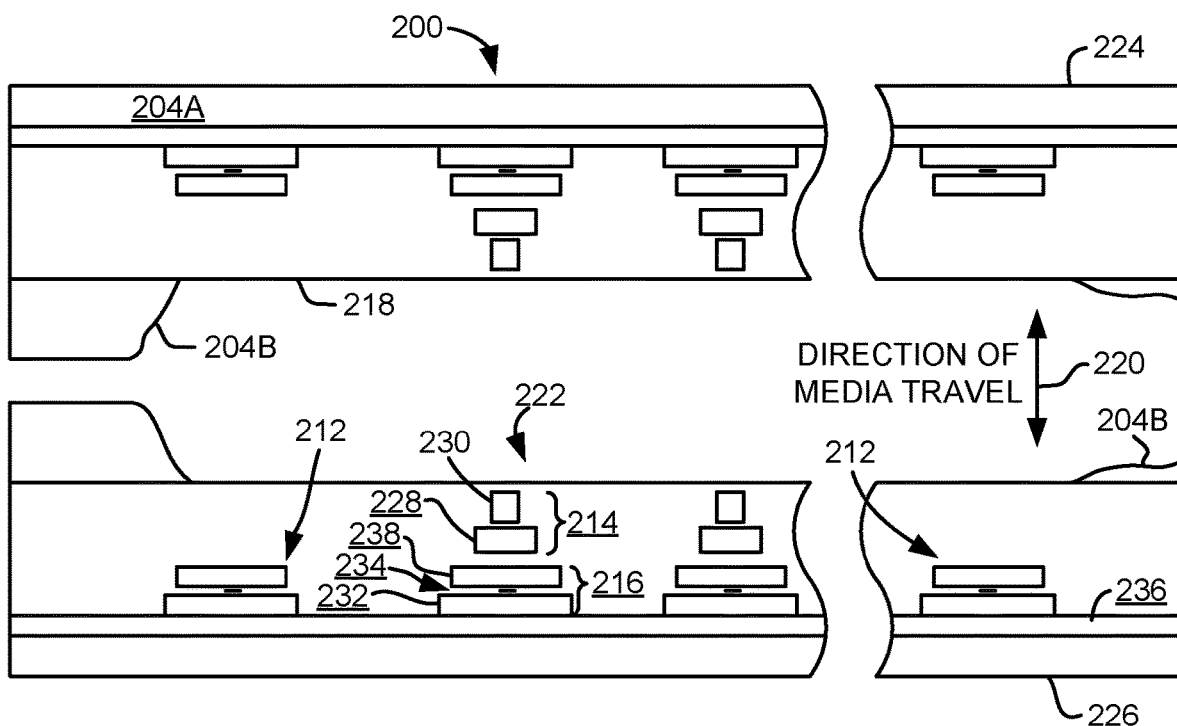
FIG. 2D is a detailed view of a partial tape bearing surface of a pair of modules.

FIG. 2D shows a partial tape bearing surface view of complementary modules of a magnetic tape head 200 according to one embodiment. In this embodiment, each module has a plurality of read/write (R/W) pairs in a piggyback configuration formed on a common substrate 204A and an optional electrically insulative insulating layer 236. The writers 214 and the readers 216 are aligned parallel to an intended direction of travel of a tape medium thereacross to form a R/W pair, exemplified by R/W pairs 222. Note that the intended direction of tape travel is sometimes referred to herein as the direction of tape travel, and such terms may be used interchangeably. Such direction of tape travel may be inferred from the design of the system, e.g., by examining the guides; observing the actual direction of tape travel relative to the reference point; etc. Moreover, in a system operable for bi-direction reading and/or writing, the direction of tape travel in both directions is typically parallel and thus both directions may be considered equivalent to each other.

Several R/W pairs 222 may be present, such as 8, 16, 32 pairs, etc. The R/W pairs 222 as shown are linearly aligned in a direction generally perpendicular to a direction of tape travel thereacross. However, the pairs may also be aligned diagonally, etc. Servo readers 212 are positioned on the outside of the array of R/W pairs, the function of which is well known.

Generally, the magnetic tape medium moves in either a forward or reverse direction as indicated by arrow 220. The magnetic tape medium and head assembly 200 operate in a transducing relationship in the manner well-known in the art. The head assembly 200 includes two thin-film modules 224 and 226 of generally identical construction.

Modules 224 and 226 are joined together with a space present between closures 204B thereof (partially shown) to form a single physical unit to provide read-while-write capability by activating the writer of the leading module and reader of the trailing module aligned with the writer of the leading module parallel to the direction of tape travel relative thereto. When a module 224, 226 of a magnetic tape head 200 is constructed, layers are formed in the gap 218 created above an electrically conductive substrate 204A (partially shown), e.g., of AlTiC, in generally the following order for the R/W pairs 222: an insulating layer 236, a first shield 232 typically of an iron alloy such as NiFe (—), cobalt zirconium tantalum (CZT) or Al—Fe—Si (Sendust), a sensor 234 for sensing a data track on a magnetic medium, a second shield 238 typically of a nickel-iron alloy (e.g., ~80/20 at % NiFe, also known as permalloy), first and second writer poles 228, 230, and a coil (not shown). The sensor may be of any known type, including those based on magnetoresistive (MR), GMR, AMR, tunneling magnetoresistance (TMR), etc.

The first and second writer poles 228, 230 may be fabricated from high magnetic moment materials such as ~45/55 NiFe. Note that these materials are provided by way of example only, and other materials may be used. Additional layers such as insulation between the shields and/or pole tips and an insulation layer surrounding the sensor may be present. Illustrative materials for the insulation include alumina and other oxides, insulative polymers, etc.

Figure 4:
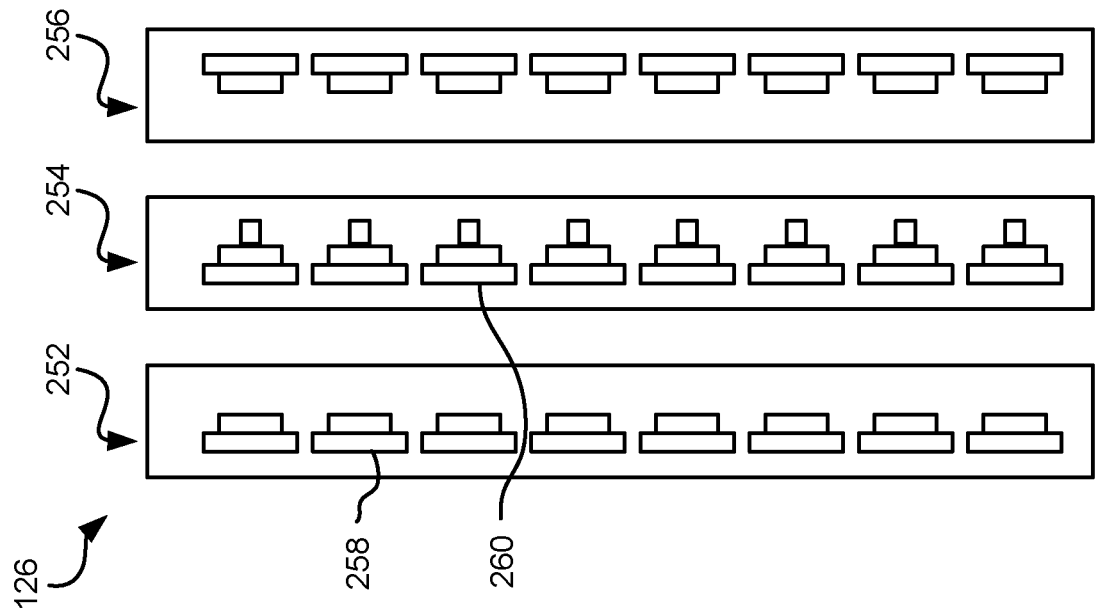
FIG. 4 is a partial tape bearing surface view of a magnetic head having a read-write-read configuration.
Figure 3:
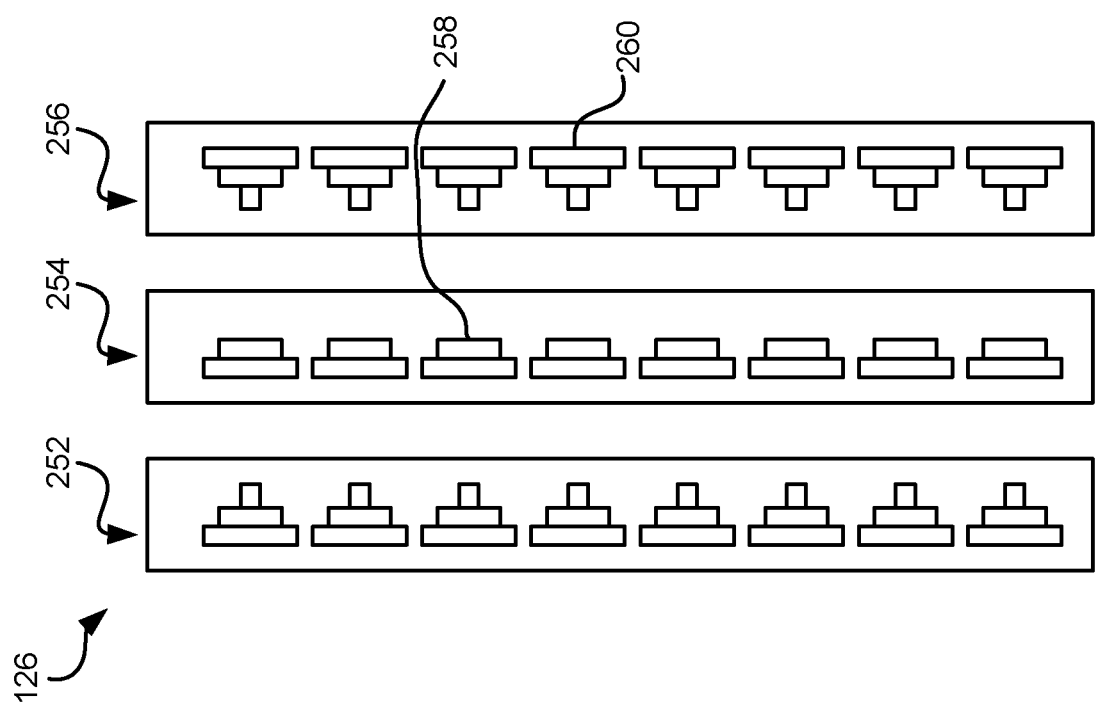
FIG. 3 is a partial tape bearing surface view of a magnetic head having a write-read-write configuration.

The configuration of the tape head 126 according to one embodiment includes multiple modules, preferably three or more. In a write-read-write (W-R-W) head, outer modules for writing flank one or more inner modules for reading. Referring to FIG. 3, depicting a W-R-W configuration, the outer modules 252, 256 each include one or more arrays of writers 260. The inner module 254 of FIG. 3 includes one or more arrays of readers 258 in a similar configuration. Variations of a multi-module head include a R-W-R head (FIG. 4), a R-R-W head, a W-W-R head, etc. In yet other variations, one or more of the modules may have read/write pairs of transducers. Moreover, more than three modules may be present. In further approaches, two outer modules may flank two or more inner modules, e.g., in a W-R-R-W, a R-W-W-R arrangement, etc. For simplicity, a W-R-W head is used primarily herein to exemplify embodiments of the present disclosure. One skilled in the art apprised with the teachings herein will appreciate how permutations of the present disclosure would apply to configurations other than a W-R-W configuration.

Figure 5:
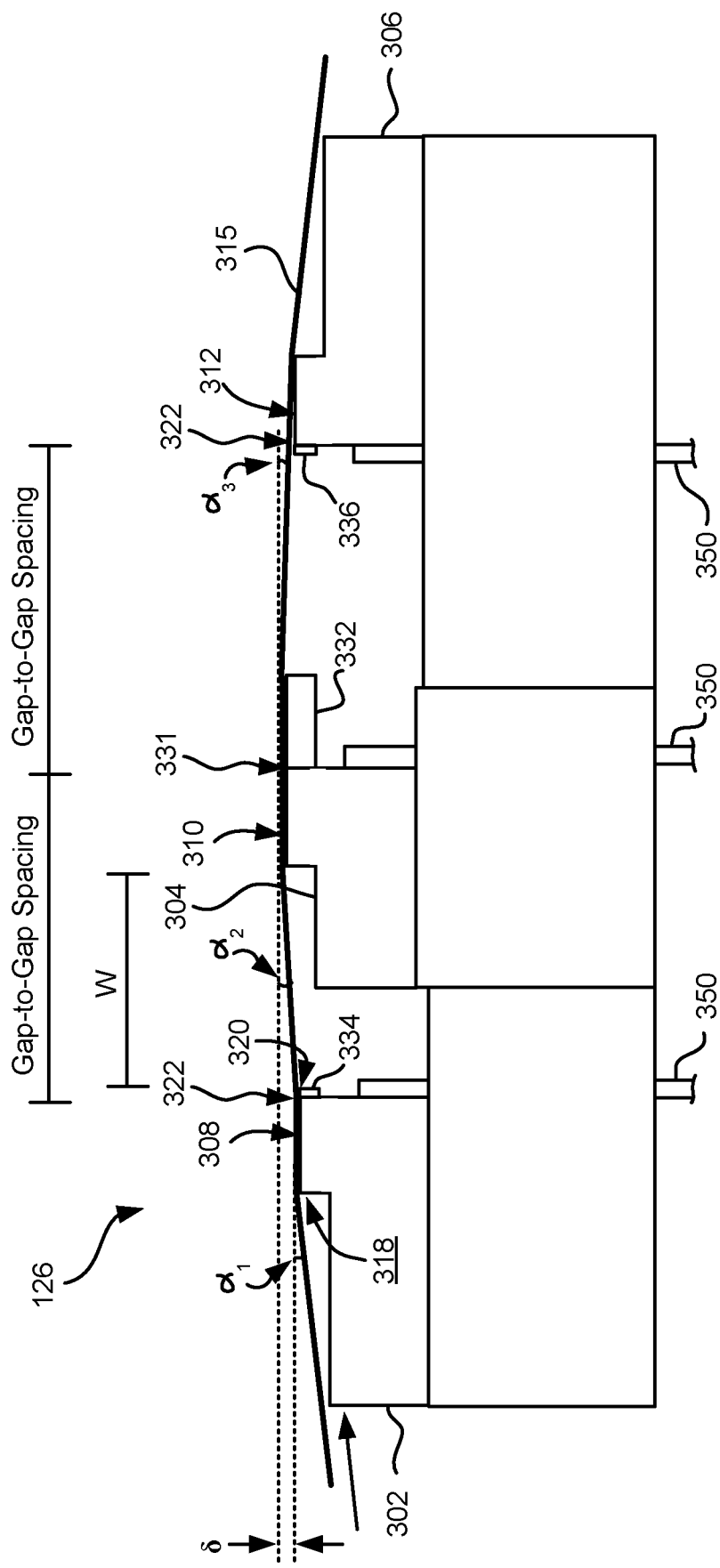
FIG. 5 is a side view of a magnetic tape head with three modules according to one embodiment where the modules all generally lie along about parallel planes.

FIG. 5 illustrates a magnetic head 126 according to one embodiment of the present disclosure that includes first, second and third modules 302, 304, 306 each having a tape bearing surface 308, 310, 312 respectively, which may be flat, contoured, etc. Note that while the term "tape bearing surface" appears to imply that the surface facing the tape 315 is in physical contact with the tape bearing surface, this is not necessarily the case. Rather, only a portion of the tape may be in contact with the tape bearing surface, constantly or intermittently, with other portions of the tape riding (or "flying") above the tape bearing surface on a layer of air, sometimes referred to as an "air bearing". The first module 302 will be referred to as the "leading" module as it is the first module encountered by the tape in a three module design for tape moving in the indicated direction. The third module 306 will be referred to as the "trailing" module. The trailing module follows the middle module and is the last module seen by the tape in a three module design. The leading and trailing modules 302, 306 are referred to collectively as outer modules. Also note that the outer modules 302, 306 will alternate as leading modules, depending on the direction of travel of the tape 315.

Figure 6:
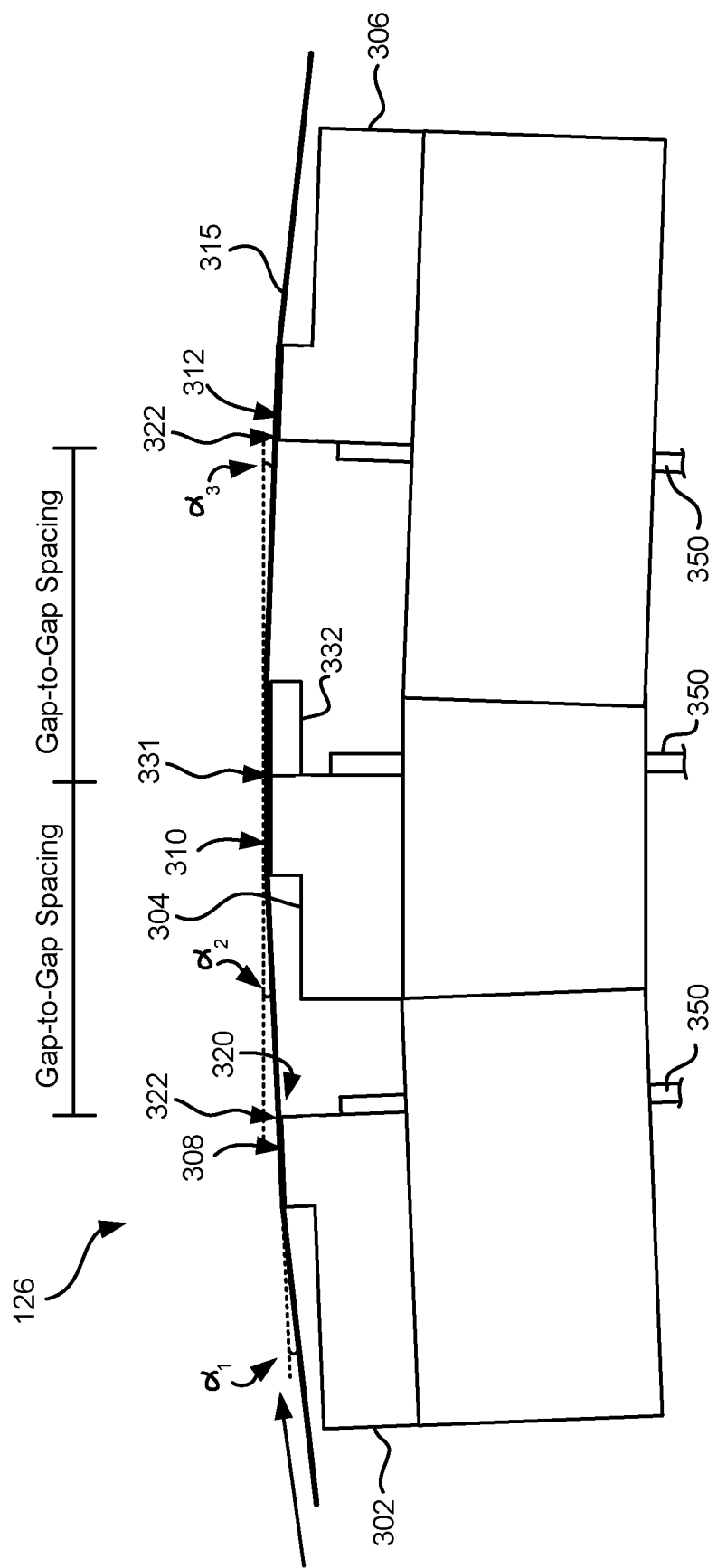
FIG. 6 is a side view of a magnetic tape head with three modules in a tangent (angled) configuration.

In one embodiment, the tape bearing surfaces 308, 310, 312 of the first, second and third modules 302, 304, 306 lie on about parallel planes (which is meant to include parallel and nearly parallel planes, e.g., between parallel and tangential as in FIG. 6), and the tape bearing surface 310 of the second module 304 is above the tape bearing surfaces 308, 312 of the first and third modules 302, 306. As described below, this has the effect of creating the desired wrap angle $\alpha_2$ of the tape relative to the tape bearing surface 310 of the second module 304.

Where the tape bearing surfaces 308, 310, 312 lie along parallel or nearly parallel yet offset planes, intuitively, the tape should peel off of the tape bearing surface 308 of the leading module 302. However, the vacuum created by a skiving edge 318 of the leading module 302 has been found by experimentation to be sufficient to keep the tape adhered to the tape bearing surface 308 of the leading module 302. A trailing edge 320 of the leading module 302 (the end from which the tape leaves the leading module 302) is the approximate reference point which defines the wrap angle $\alpha_2$ over the tape bearing surface 310 of the second module 304. The tape stays in close proximity to the tape bearing surface until close to the trailing edge 320 of the leading module 302. Accordingly, transducers 322 may be located near the trailing edges of the outer modules 302, 306. These embodiments are particularly adapted for write-read-write applications.

A benefit of this and other embodiments described herein is that, because the outer modules 302, 306 are fixed at a determined offset from the second module 304, the inner wrap angle $\alpha_2$ is fixed when the modules 302, 304, 306 are coupled together or are otherwise fixed into a head. The inner wrap angle $\alpha_2$ is approximately $\tan^{-1}(\delta/W)$ where $\delta$ is the height difference between the planes of the tape bearing surfaces 308, 310 and W is the width between the opposing ends of the tape bearing surfaces 308, 310. An illustrative inner wrap angle $\alpha_2$ is in a range of about 0.3° to about 1.1°, though can be any angle required by the design.

Beneficially, the inner wrap angle $\alpha_2$ on the side of the module 304 receiving the tape (leading edge) will be larger than the inner wrap angle $\alpha_3$ on the trailing edge, as the tape 315 rides above the trailing module 306. This difference is generally beneficial as a smaller $\alpha_3$ tends to oppose what has heretofore been a steeper exiting effective wrap angle.

Note that the tape bearing surfaces 308, 312 of the outer modules 302, 306 are positioned to achieve a negative wrap angle at the trailing edge 320 of the leading module 302. This is generally beneficial in helping to reduce friction due to contact with the trailing edge 320, provided that proper consideration is given to the location of the crowbar region that forms in the tape where it peels off the head. This negative wrap angle also reduces flutter and scrubbing damage to the elements on the leading module 302. Further, at the trailing module 306, the tape 315 flies over the tape bearing surface 312 so there is virtually no wear on the elements when tape is moving in this direction. Particularly, the tape 315 entrains air and so will not significantly ride on the tape bearing surface 312 of the third module 306 (some contact may occur). This is permissible, because the leading module 302 is writing while the trailing module 306 is idle.

Writing and reading functions are performed by different modules at any given time. In one embodiment, the second module 304 includes a plurality of data and optional servo readers 331 and no writers. The first and third modules 302, 306 include a plurality of writers 322 and no data readers, with the exception that the outer modules 302, 306 may include optional servo readers. The servo readers may be used to position the head during reading and/or writing operations. The servo reader(s) on each module are typically located towards the end of the array of readers or writers.

By having only readers or side by side writers and servo readers in the gap between the substrate and closure, the gap length can be substantially reduced. Typical heads have piggybacked readers and writers, where the writer is formed above each reader. A typical gap is 20-35 microns. However, irregularities on the tape may tend to droop into the gap and create gap erosion. Thus, the smaller the gap is the better. The smaller gap enabled herein exhibits fewer wear related problems.

In some embodiments, the second module 304 has a closure, while the first and third modules 302, 306 do not have a closure. Where there is no closure, preferably a hard coating is added to the module. One preferred coating is diamond-like carbon (DLC).

In the embodiment shown in FIG. 5, the first, second, and third modules 302, 304, 306 each have a closure 332, 334, 336, which extends the tape bearing surface of the associated module, thereby effectively positioning the read/write elements away from the edge of the tape bearing surface. The closure 332 on the second module 304 can be a ceramic closure of a type typically found on tape heads. The closures 334, 336 of the first and third modules 302, 306, however, may be shorter than the closure 332 of the second module 304 as measured parallel to a direction of tape travel over the respective module. This enables positioning the modules closer together. One way to produce shorter closures 334, 336 is to lap the standard ceramic closures of the second module 304 an additional amount. Another way is to plate or deposit thin film closures above the elements during thin film processing. For example, a thin film closure of a hard material such as Sendust or nickel-iron alloy (e.g., 45/55) can be formed on the module.

With reduced-thickness ceramic or thin film closures 334, 336 or no closures on the outer modules 302, 306, the write-to-read gap spacing can be reduced to less than about 1 mm, e.g., about 0.75 mm, or 50% less than commonly-used linear tape open (LTO) tape head spacing. The open space between the modules 302, 304, 306 can still be set to approximately 0.5 to 0.6 mm, which in some embodiments is ideal for stabilizing tape motion over the second module 304.

Depending on tape tension and stiffness, it may be desirable to angle the tape bearing surfaces of the outer modules relative to the tape bearing surface of the second module. FIG. 6 illustrates an embodiment where the modules 302, 304, 306 are in a tangent or nearly tangent (angled) configuration. Particularly, the tape bearing surfaces of the outer modules 302, 306 are about parallel to the tape at the desired wrap angle $\alpha_2$ of the second module 304. In other words, the planes of the tape bearing surfaces 308, 312 of the outer modules 302, 306 are oriented at about the desired wrap angle $\alpha_2$ of the tape 315 relative to the second module 304. The tape will also pop off of the trailing module 306 in this embodiment, thereby reducing wear on the elements in the trailing module 306. These embodiments are particularly useful for write-read-write applications. Additional aspects of these embodiments are similar to those given above.

Typically, the tape wrap angles may be set about midway between the embodiments shown in FIGS. 5 and 6.

Figure 7:
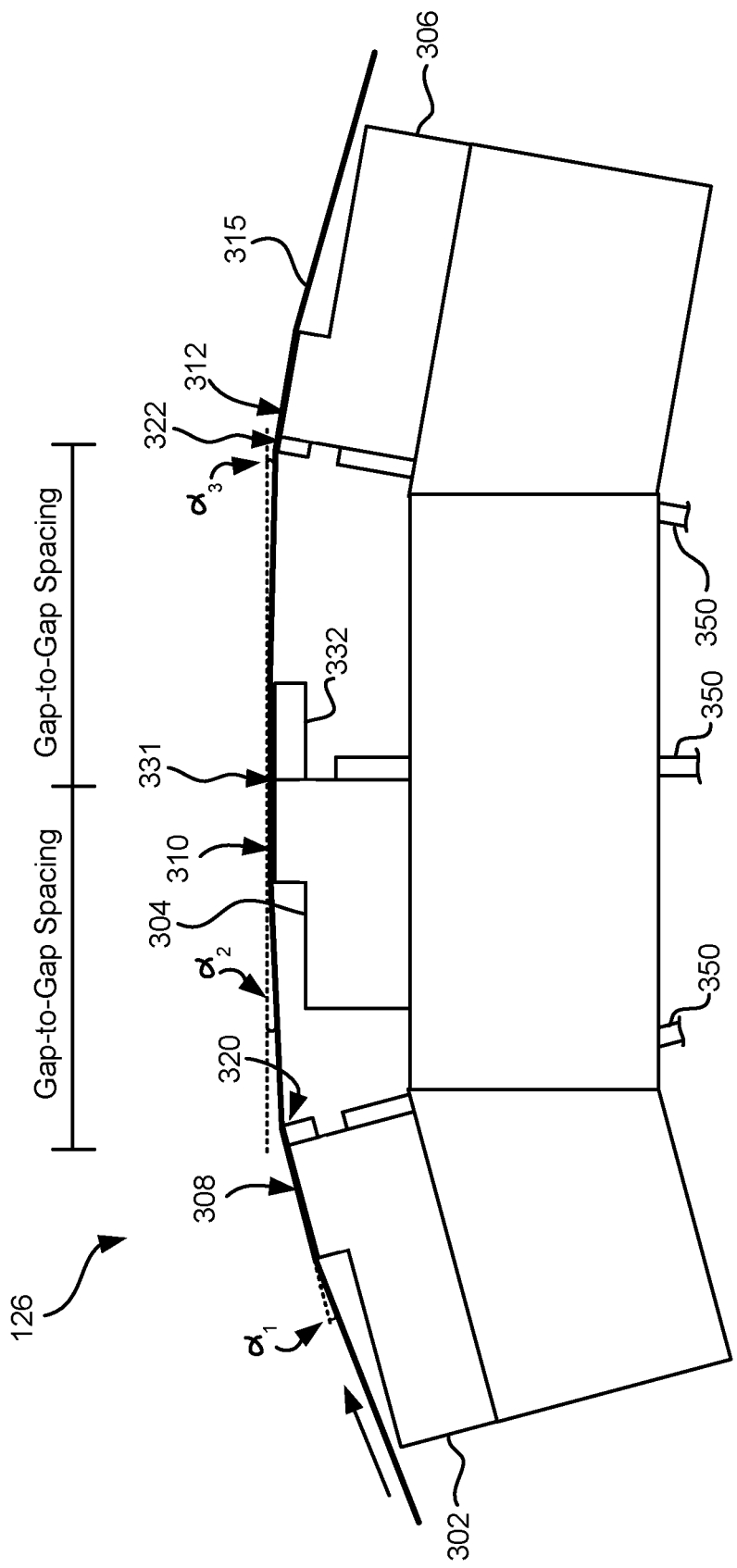
FIG. 7 is a side view of a magnetic tape head with three modules in an overwrap configuration.

FIG. 7 illustrates an embodiment where the modules 302, 304, 306 are in an overwrap configuration. Particularly, the tape bearing surfaces 308, 312 of the outer modules 302, 306 are angled slightly more than the tape 315 when set at the desired wrap angle $\alpha_2$ relative to the second module 304. In this embodiment, the tape does not pop off of the trailing module, allowing it to be used for writing or reading. Accordingly, the leading and middle modules can both perform reading and/or writing functions while the trailing module can read any just-written data. Thus, these embodiments are preferred for write-read-write, read-write-read, and write-write-read applications. In the latter embodiments, closures should be wider than the tape canopies for ensuring read capability. The wider closures may require a wider gap-to-gap separation. Therefore, a preferred embodiment has a write-read-write configuration, which may use shortened closures that thus allow closer gap-to-gap separation.

Additional aspects of the embodiments shown in FIGS. 6 and 7 are similar to those given above.

A 32 channel version of a multi-module tape head 126 may use cables 350 having leads on the same or smaller pitch as current 16 channel piggyback LTO modules, or alternatively the connections on the module may be organ-keyboarded for a 50% reduction in cable span. Over-under, writing pair unshielded cables may be used for the writers, which may have integrated servo readers.

The outer wrap angles $\alpha_1$ may be set in the drive, such as by guides of any type known in the art, such as adjustable rollers, slides, etc. or alternatively by outriggers, which are integral to the head. For example, rollers having an offset axis may be used to set the wrap angles. The offset axis creates an orbital arc of rotation, allowing precise alignment of the wrap angle $\alpha_1$.

To assemble any of the embodiments described above, conventional u-beam assembly can be used. Accordingly, the mass of the resultant head may be maintained or even reduced relative to heads of previous generations. In other approaches, the modules may be constructed as a unitary body. Those skilled in the art, armed with the present teachings, will appreciate that other known methods of manufacturing such heads may be adapted for use in constructing such heads. Moreover, unless otherwise specified, processes and materials of types known in the art may be adapted for use in various embodiments in conformance with the teachings herein, as would become apparent to one skilled in the art upon reading the present disclosure.

Figure 8A:
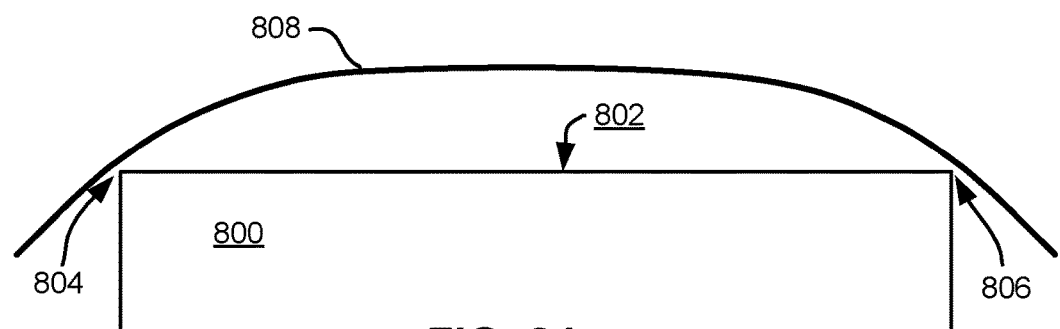
FIGS. 8A-8C are schematics depicting the principles of tape tenting.
Figure 8B:
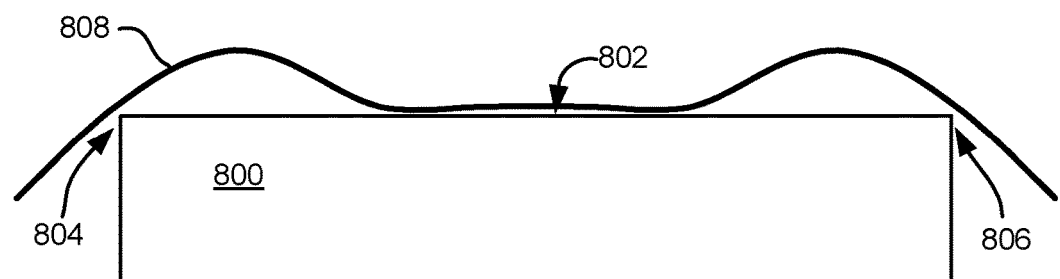
Figure 8C:
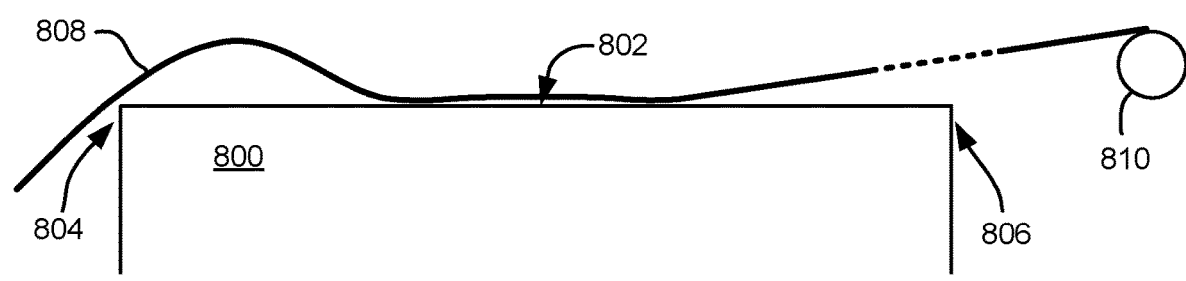

As a tape is run over a module, it is preferred that the tape passes sufficiently close to magnetic transducers on the module such that reading and/or writing is efficiently performed, e.g., with a low error rate. According to some approaches, tape tenting may be used to ensure the tape passes sufficiently close to the portion of the module having the magnetic transducers. To better understand this process, FIGS. 8A-8C illustrate the principles of tape tenting. FIG. 8A shows a module 800 having an upper tape bearing surface 802 extending between opposite edges 804, 806. A stationary tape 808 is shown wrapping around the edges 804, 806. As shown, the bending stiffness of the tape 808 lifts the tape off of the tape bearing surface 802. Tape tension tends to flatten the tape profile, as shown in FIG. 8A. Where tape tension is minimal, the curvature of the tape is more parabolic than shown.

FIG. 8B depicts the tape 808 in motion. The leading edge, i.e., the first edge the tape encounters when moving, may serve to skive air from the tape, thereby creating a subambient air pressure between the tape 808 and the tape bearing surface 802. In FIG. 8B, the leading edge is the left edge and the right edge is the trailing edge when the tape is moving left to right. As a result, atmospheric pressure above the tape urges the tape toward the tape bearing surface 802, thereby creating tape tenting proximate each of the edges. The tape bending stiffness resists the effect of the atmospheric pressure, thereby causing the tape tenting proximate both the leading and trailing edges. Modeling predicts that the two tents are very similar in shape.

FIG. 8C depicts how the subambient pressure urges the tape 808 toward the tape bearing surface 802 even when a trailing guide 810 is positioned above the plane of the tape bearing surface.

It follows that tape tenting may be used to direct the path of a tape as it passes over a module. As previously mentioned, tape tenting may be used to ensure the tape passes sufficiently close to the portion of the module having the magnetic transducers, preferably such that reading and/or writing is efficiently performed, e.g., with a low error rate.

Magnetic tapes may be stored in tape cartridges that are, in turn, stored at storage slots or the like inside a data storage library. The tape cartridges may be stored in the library such that they are accessible for physical retrieval. In addition to magnetic tapes and tape cartridges, data storage libraries may include data storage drives that store data to, and/or retrieve data from, the magnetic tapes. Moreover, tape libraries and the components included therein may implement a file system which enables access to tape and data stored on the tape.

File systems may be used to control how data is stored in, and retrieved from, memory. Thus, a file system may include the processes and data structures that an operating system uses to keep track of files in memory, e.g., the way the files are organized in memory. Linear Tape File System (LTFS) is an exemplary format of a file system that may be implemented in a given library in order to enables access to compliant tapes. It should be appreciated that various embodiments herein can be implemented with a wide range of file system formats, including for example IBM Spectrum Archive Library Edition (LTFS LE). However, to provide a context, and solely to assist the reader, some of the embodiments below may be described with reference to LTFS which is a type of file system format. This has been done by way of example only, and should not be deemed limiting on the invention defined in the claims.

A tape cartridge may be "loaded" by inserting the cartridge into the tape drive, and the tape cartridge may be "unloaded" by removing the tape cartridge from the tape drive. Once loaded in a tape drive, the tape in the cartridge may be "threaded" through the drive by physically pulling the tape (the magnetic recording portion) from the tape cartridge, and passing it above a magnetic head of a tape drive. Furthermore, the tape may be attached on a take-up reel (e.g., see 121 of FIG. 1A above) to move the tape over the magnetic head.

Once threaded in the tape drive, the tape in the cartridge may be "mounted" by reading metadata on a tape and bringing the tape into a state where the LTFS is able to use the tape as a constituent component of a file system. Moreover, in order to "unmount" a tape, metadata is preferably first written on the tape (e.g., as an index), after which the tape may be removed from the state where the LTFS is allowed to use the tape as a constituent component of a file system. Finally, to "unthread" the tape, the tape is unattached from the take-up reel and is physically placed back into the inside of a tape cartridge again. The cartridge may remain loaded in the tape drive even after the tape has been unthreaded, e.g., waiting for another read and/or write request. However, in other instances, the tape cartridge may be unloaded from the tape drive upon the tape being unthreaded, e.g., as described above.

Magnetic tape is a sequential access medium. Thus, new data is written to the tape by appending the data at the end of previously written data. It follows that when data is recorded in a tape having only one partition, metadata (e.g., allocation information) is continuously appended to an end of the previously written data as it frequently updates and is accordingly rewritten to tape. As a result, the rearmost information is read when a tape is first mounted in order to access the most recent copy of the metadata corresponding to the tape. However, this introduces a considerable amount of delay in the process of mounting a given tape.

To overcome this delay caused by single partition tape mediums, the LTFS format includes a tape that is divided into two partitions, which include an index partition and a data partition. The index partition may be configured to record metadata (meta information), e.g., such as file allocation information (Index), while the data partition may be configured to record the body of the data, e.g., the data itself.

Figure 9:
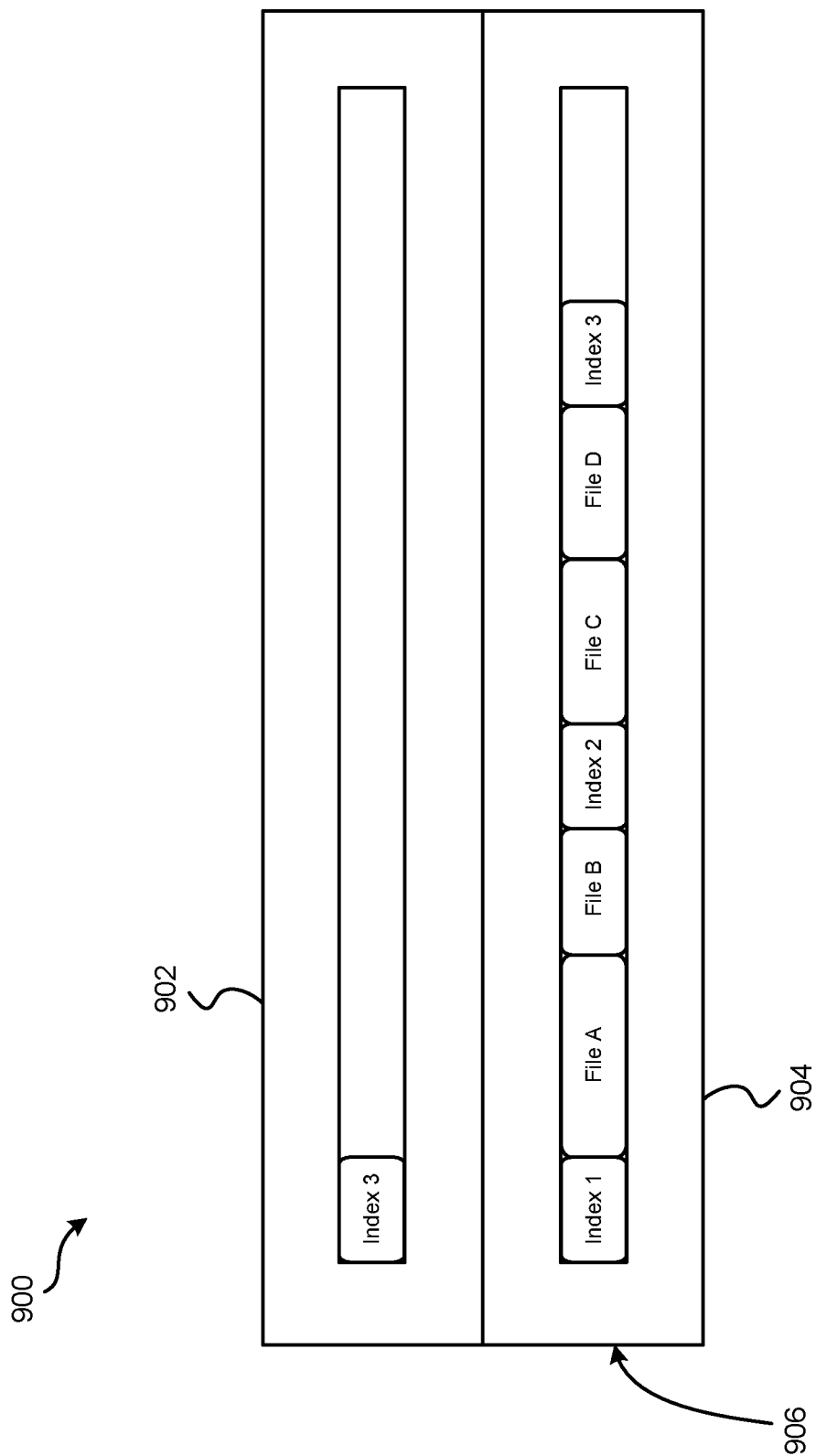
FIG. 9 is a representational diagram of files and indexes stored on a magnetic tape according to one embodiment.

Looking to FIG. 9, a magnetic tape 900 having an index partition 902 and a data partition 904 is illustrated according to one embodiment. As shown, data files and indexes are stored on the tape. The LTFS format allows for index information to be recorded in the index partition 902 at the beginning of tape 906, as would be appreciated by one skilled in the art upon reading the present description.

As index information is updated, it preferably overwrites the previous version of the index information, thereby allowing the currently updated index information to be accessible at the beginning of tape in the index partition. According to the specific example illustrated in FIG. 9, a most recent version of metadata Index 3 is recorded in the index partition 902 at the beginning of the tape 906. Conversely, all three version of metadata Index 1, Index 2, Index 3 as well as data File A, File B, File C, File D are recorded in the data partition 904 of the tape. Although Index 1 and Index 2 are old (e.g., outdated) indexes, because information is written to tape by appending it to the end of the previously written data as described above, these old indexes Index 1, Index 2 remain stored on the tape 900 in the data partition 904 without being overwritten.

The metadata may be updated in the index partition 902 and/or the data partition 904 the same or differently depending on the desired embodiment. According to some embodiments, the metadata of the index and/or data partitions 902, 904 may be updated in response to the tape being unmounted, e.g., such that the index may be read quickly from the index partition when that tape is mounted again. The metadata is preferably also written in the data partition 904 so the tape may be mounted using the metadata recorded in the data partition 904, e.g., as a backup option.

According to one example, which is no way intended to limit the disclosure, LTFS LE may be used to provide the functionality of writing an index in the data partition when a user explicitly instructs the system to do so, or at a time designated by a predetermined period which may be set by the user, e.g., such that data loss in the event of sudden power stoppage can be mitigated.

It is known that conventional tape drives may have difficulty reading tapes that were written and then stored. The cause of the inability to read tapes has been found to be derived from a mis-registration between outermost tracks in head modules and tracks recorded on tapes prior to storing the tapes.

It is now known that in some instances, pitch between elements is not the same for all modules. There has been an assumption in the industry, that element pitch is essentially perfect in each head module, e.g., the pitch matches wafer photo masks. However, recent data indicate element pitch may vary up to 150 parts per million (ppm) from module-to-module and, as such, may contribute significantly to the aforementioned mis-registration. For modern head modules, which use timing based servo processes, the pitch variation of, for example, 200 ppm translates to, for example, a 572 nanometer variation in an exemplary 2859 μm separation between servo readers 1 and 2.

Figure 10:
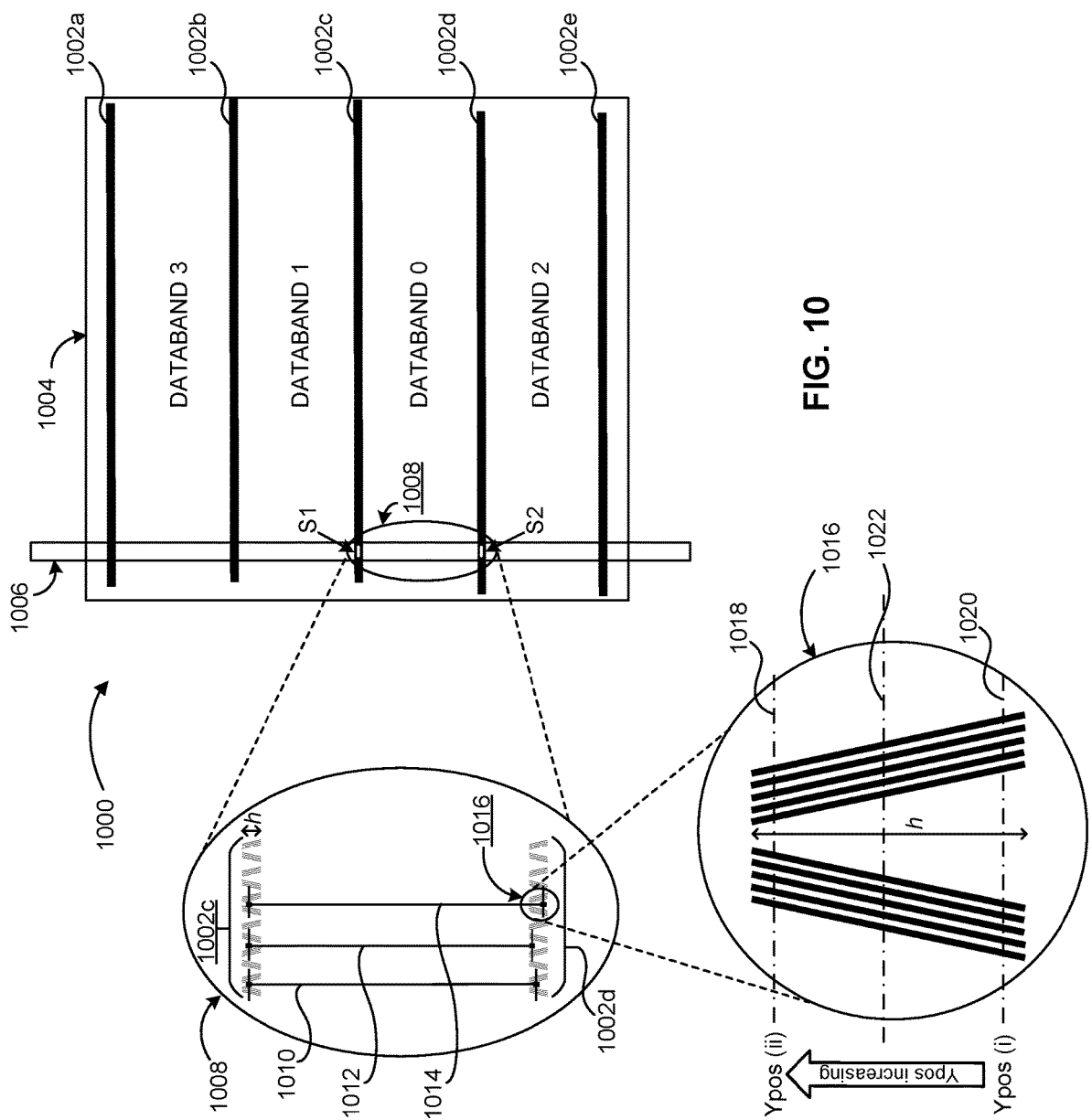
FIG. 10 is a schematic showing a magnetic recording head having an ideal, a narrower, and a wider span between servo readers, according to one approach.

FIG. 10 is a schematic showing a magnetic recording head 1006 having an ideal, a narrower, and a wider span between servo readers S1 and S2. The magnetic recording head 1006 is part of an apparatus 1000 for reading a magnetic recording tape 1004 having four databands and five timing-based servo patterns. As shown, the magnetic recording tape 1004 has 5 timing-based servo patterns 1002a, 1002b, 1002c, 1002d, 1002e. Each set of adjacent timing based servo patterns flank a respective databand, for example, databand 0 has timing-based servo patterns 1002c and 1002d along databand 0.

Oval 1008 shows a magnified view of the timing based servo patterns 1002c, 1002d associated with databand 0 of the magnetic recording tape 1004 as read by servo readers S1, S2 of the magnetic recording head 1006. The distance between S1 and S2 of the magnetic recording head may have a specification of 2859 μm. The height h of each timing-based servo pattern 1002a, 1002b, 1002c, 1002d, 1002e on the magnetic recording tape 1004 is 93 μm. A distance between each centerline of the servo pattern (e.g., centerline 1022 of a single servo pattern of circle 1016) read by each servo reader S1, S2 of a perfect tape may be preferably approximately 2859 μm. Thus, from the position of the servo reader S1, S2 on the timing-based servo pattern 1002c, 1002d, the head span may be measured relative to the servo patterns on the tape.

Circle 1016 of FIG. 10 is a magnified view of a single chevron set of a servo pattern being read by servo reader S2. A Y position (Ypos) value may be determined by the vertical position of the servo reader S2 on the chevron servo pattern. For example, the servo reader S2 having a position nearer the Ypos (i) region 1020 of the servo pattern generates a smaller Ypos value. As the servo reader, e.g., S2, moves up the chevron servo pattern the Ypos value increases. Thus, a Ypos value nearer the Ypos (ii) region 1018 of the servo pattern is greater than a Ypos value near the Ypos (i) region 1020 of the servo pattern. A Ypos value is measured for each servo reader S1, S2 relative to the position of the servo reader on the servo pattern.

The registration between the servo readers on the head and the servo tracks on the tape may be determined by a delta Ypos (ΔYpos) value of the Ypos values for each servo reader, according to Equation 1.

$$\Delta Ypos = Ypos\ S1 - Ypos\ S2 \qquad \text{Equation 1}$$

A head span perfectly aligned to a tape would have a ΔYpos=0, in other words, each servo reader is positioned at the same location in the relative servo track. Thus, the ΔYpos is relative to the head span 1010 of oval 1008.

A head span contracted relative to the tape (or the tape expanded relative to the head span) would have a ΔYpos<0, in other words, servo reader S2 is nearer the 1018 position on the servo track. Thus, the ΔYpos is relative to the head span 1012 of oval 1008.

A head span expanded relative to a tape (or the tape contracted relative to the head span) would have a ΔYpos>0, in other words servo reader S2 is nearer the 1020 position on the servo track. Thus, the ΔYpos is relative to the head span 1014 of 1008.

Moreover, increasing track density and tape cartridge capacity for future generations of tape drives and tape cartridges may seriously limit readability of tape even though improvements have been made to minimize creep characteristics of media. While head span variation is believed to arise from a combination of wafer design and/or fabrication details, so far only tape tension control addresses compensation of module-to-module variation and the effects of media creep. However, applying tension control of the tape may not always provide sufficient range to address mis-registration for tape interchange.

According to various approaches described herein, a memory in the tape drive contains information pertaining to the spans of modules of the tape drive. This information stored in the tape drive memory enables screening, quality tracking, tape initialization, and/or other performance attributes of the modules and/or tape run on the modules. Conventional tape drives do not include a provision or programming to store information pertaining to the spans of the modules of the same tape drive. Embodiments described herein may be used in conjunction with tape initialization processes, which in turn may enable cartridge capacity growth for at least another generation.

In one aspect, an apparatus includes a module having an array of transducers having at least two transducers and a persistent memory that includes data of a span of the array of transducers at a particular temperature. In one approach, the at least two transducers include servo readers, where the span is the distance between two servo readers.

In one aspect, an apparatus includes a plurality of modules, each module having an array of transducers having at least two transducers, and a persistent memory comprising data of spans of the arrays of transducers at a particular temperature.

A particular temperature may be the temperature at the time the measurements were taken, a known temperature, a predetermined temperature, etc. Since a head in general expands/contracts with increases/decreases in temperature, it is desirable to determine the known head span at that particular temperature. For example, and not meant to be limiting, an aluminum oxide-titanium carbide wafer material, on which thin films head are deposited, and from which closures are fabricated, has a non-zero coefficient of thermal expansion, a typical value being approximately 7.8 ppm/° C. Thus, a temperature change of one degree Celsius (° C.) induces a servo-servo separation distance of approximately 22.3 nanometers. Consequently, a 10° C. degree temperature change may result in a 223 nanometer change in span. Thus, it is highly desirable to maintain a constant or predetermined temperature for all measurements of the span.

In one approach, the span may be measured between centerlines of the respective centerlines of the respective servo readers. Equivalently, the span can be the distance between facing ends of the servo readers. In one approach, the centerlines may be geometric centerlines. In another approach, the centerlines may be magnetic centerlines.

In one approach, the span is the distance between distal data readers of the array of transducers. For example, the distal data readers may be the outermost data readers, and/or data readers positioned toward the ends at known location.

In another approach, the span is the distance between outer data writers of the array of transducers. For example, the outer data writers may be the outermost data writers, or data writers positioned toward the ends at known location. In one approach, the span may be measured between respective centerlines of the data writers. In another approach, the span may be measured between shingling edges of the data writers. The shingling edges are the edges that define the edge of the written shingled track.

In one approach, the spans are within a specified range. If a span falls outside the range, the module corresponding thereto may be rejected. In one approach, the spans are traceable to a standard value. The standard value can be defined by a standard, e.g., 2858.8 microns. In another approach, the spans may be within 50 nm of the standard value, more preferably within 20 nm.

In one approach, the data includes a relative head span, the relative head span being the difference between the span of the array of transducers and a target span of an array of transducers at a particular temperature. In one approach, the span of the array is the length between a first servo reader and a second servo reader in a direction parallel to the array of transducers. In one approach, the span is the length between servo 1 and servo 2 in a direction parallel to the array of transducers. A module may have 2, 3, 4, etc. servo readers of an array of transducers. In one approach, the span is the length between a second of the servo readers and a third of the servo readers in a direction parallel to the array of transducers. In another approach, the span is the length between innermost servo transducers positioned at each end of the array, e.g., in an approach having multiple servo readers at each end of the array. In a further approach, the span is the length between outermost transducers positioned at each end of the array.

In a preferred approach, a tape drive may have a region of persistent memory contained therein. Looking back to FIG. 1A, the memory 136 may comprise a persistent memory of or coupled to the controller 128 of the tape drive 100. In one approach, the apparatus has a persistent memory that includes vital product data (VPD) stored therein. In one approach, data of the spans may be stored with VPD. Storing span data with and/or in the VPD in persistent memory is advantageous because the data of the spans may be more readily accessible.

In another approach the apparatus has a persistent memory located in a radio frequency identification device (RFID) associated with the apparatus. In another approach, the apparatus has a persistent memory located in an inter-integrated circuit (I2C) memory device associated with the apparatus. For example, looking back to FIG. 1A, an I2C memory device or the RFID may be attached to a cable 130 of a tape drive 100. In one approach, the apparatus has a persistent memory in a cable associated with the apparatus. In another approach, the data of the span of the array of transducers may be stored in a database, memory in a data library, etc. These approaches are by way of example only and are not meant to be limiting in any way.

The region of persistent memory may contain information pertaining to the span of an array of transducers for each module at a particular temperature.

In some approaches, the target span may be a reference value of a specification of the module. For example, but not limited to, a target span value may be related to the conventional timing-based servo head module specification of 2859 µm (e.g., LTO and Enterprise products).

In some approaches, the target span may be obtained from a memory region of a calibrated magnetic recording tape.

In some approaches, the target span may be an average span derived from a plurality modules. In one approach, the target span may be derived from the average span of a statistically large sample of head modules. A large sample of head modules may include 20+ modules, 50+ modules, 100+ modules, 150+ modules, 200+ modules, 250+ modules, 500+ modules, 1000+ modules, 10000+ modules, etc., and the number of modules may be higher or lower. Various approaches described herein may be used to determine the average span from a large sample of modules.

In one approach, the target span is an average span that includes an average of measurements of physical spans of a plurality of modules at a particular temperature. The known temperature can be the particular temperature, assuming all other spans were measured at that particular temperature. The particular temperature at the time of measurements may be referenced and stored in the persistent memory of the tape drive.

In various approaches, the physical span of an array on a module at a known temperature may be measured using a mechanical calibration device. For example, atomic force microscopy may be used. In another approach, a conventional optical technique may be used to measure the span of each array.

In some approaches, the average span may be an average of a plurality of measurements of magnetic spans of a plurality of modules derived from reading timing based (or other) servo tracks of a magnetic recording media having known servo track span at a known temperature, humidity and tension. If the servo track span is known, then the actual span for each module can be readily determined using known techniques.

In one approach, the measurement of a magnetic span is a measurement of a span of data written to a magnetic recording medium by a calibrated writing module at a known temperature, humidity and tension.

In some approaches, calibration data may include servo band difference (SBD) measurement itself and/or information derived from the SBD measurements. To measure SBD, servo readers on the same module read respective servo patterns on the media. In the ideal case, both servo readers would measure the same position on their relative servo pattern. However, media and heads are rarely ideal, and therefore any deviation from this ideal case can be determined by comparing the position measurements from the two servo channels.

In one approach, the target span is an average span derived from a plurality of modules comprising readers and no writers. In another approach, the target span is an average span derived from a plurality of modules comprising writers and servo readers and no data readers.

In various approaches, the persistent memory of an apparatus may include a plurality of spans corresponding to the apparatus. In one approach, the apparatus includes a first module and a second module where the first module is different than the second module. In one approach, an apparatus includes a reader module and a writer module, where a span of the reader module and a span of the writer module are stored in the persistent memory. Further, the span of the reader module may be the same as or different from the span of the writer module. Moreover, the spans of the modules in a given drive may be within 50 nm of one another.

In one approach of an apparatus having a first module and a second module, the span of the first module and the span of the second module are stored in the persistent memory. The first module may be used in a first tape direction, and the second module may be used in a second tape travel direction opposite the first tape travel direction, and the span of the first module is different from the span of the second module.

Each of the steps of the method may be performed by any suitable component of the operating environment. For example, in various approaches, the method may be partially or entirely performed by a tape drive, or some other device having one or more processors therein, in conjunction with a calibrated tape. The processor, e.g., processing circuit(s), chip(s), and/or module(s) implemented in hardware and/or software, and preferably having at least one hardware component may be utilized in any device to perform one or more steps of the method. Illustrative processors include, but are not limited to, a central processing unit (CPU), an application specific integrated circuit (ASIC), a field programmable gate array (FPGA), etc., combinations thereof, or any other suitable computing device known in the art.

This process may be performed when a new module is being prepared for first use. For example, this process may be added to a conventional apparatus and/or module initialization process.

According to one approach, the method may initiate with identifying a module of an apparatus, where the apparatus includes a persistent memory and the module having an array of transducers and at least two servo readers.

In one approach, the target span is a reference value of a specification of the module. For example, in one approach, for a conventional timing-based servo head specification, the target span is 2858.8 microns.

In some approaches, the target span may be an average span derived from modules of a plurality of tape drives. In one approach the average span is an average of measurements of a physical span of each of a plurality of modules at a known temperature, a predetermined temperature at which each measurement is taken such that the plurality of measurements were taken at the same temperature. In some approaches, the physical span is measured with a mechanical calibration device.

In another approach, the average span may be an average of a plurality of measurements of magnetic spans of a plurality of modules derived from a servo reading magnetic recording media having known servo track span at a known temperature, humidity and tension.

The method includes an operation of storing the span of the module in the persistent memory for calibrating media to be run over the module.

The SBD measurements and/or derivatives thereof (collectively referred to herein as "calibration data") are stored in association with the persistent memory of the module.

Note in conventional systems, servo reader pitch varies from head to head, and therefore, the raw SBD measurements may not typically reflect the actual servo track spacing. Said another way, wider or narrower servo pitch on the head than the assumed pitch causes an error in the measurement of the current media spacing value. Accordingly, the span of the module determined by the method described provides the information to confirm the pitch of the servo readers on the head is known and can be used to adjust (compensate) the SBD values so that the SBD values more accurately reflect the actual media spacing characteristics. The pitch of the servo readers corresponds directly to the spacing of the servo readers relative to each other, and may be center-to-center pitch, edge-to-edge pitch, etc.

The pitch of the servo readers relative to the span of the module may be derived or obtained by methods described herein. Typically, this value is stored in the memory of each drive during manufacture thereof. In one approach, the pitch is measured for each drive at manufacturing and placed in a non-volatile area of drive memory such as with the vital product data (VPD). This head calibration can be performed in multiple ways, such as measurement with an atomic force microscope (AFM) using stages, the use of a reference tape having servo tracks of known spacing, or any other method which provides a measurement of transducers relative to other transducers. In another approach, the pitch is measured for a drive after the drive has been built, and optionally in use. In a preferred approach, a reference tape may be used.

By using the pitch value stored in the VPD, a new tape may be characterized and the measurements observed may be compensated according to the head spacing value stored in VPD, thus ensuring that the measurements taken, and corresponding values ultimately written to the cartridge memory (CM), are representative of the cartridge, and not unduly influenced by the head making the measurement.

Additionally, by using temperature and/or humidity sensors in the drive (and/or external sensors with information communicated to the drive), the effects of the local temperature and/or humidity can also be compensated for. For example, if the humidity is high, then tape expands and the cartridge is initialized at this high humidity condition. It is desired that the stored SBD values represent a nominal condition in head spacing, temperature, and humidity.

The method described herein may be performed as part of a cartridge initialization procedure. For example, in addition to performing conventional special operations during the first load of a brand-new cartridge, the operations of the method may be performed during the cartridge initialization process.

The temperature at the time of measurements may be referenced and stored in the persistent memory of the tape drive.

In some approaches, there may be more than one target span for a tape drive. For example, a target span of a reader module may be systematically different than the target span of a writer module. All target spans of all versions of the module may be stored in the persistent memory of the tape drive.

In yet another approach, fiducials at known positions relative to and proximate an array of transducers may be used to calibrate the drive. In such case, the persistent memory stores data of a span between the fiducials at a particular temperature. Preferably, each fiducial is a fiducial pair, but in some approaches, each fiducial is a single feature.

Any known type of fiducial commonly used in thin film fabrication techniques may be used. Moreover, any known technique for measuring the span between fiducials may be used. The fiducial span may be used in conjunction with the known locations of the fiducials relative to the array to characterize the span of the array.

The fiducials in a module may include plated films, sputtered features, and/or other structures formed on or in the thin film structure by conventional deposition techniques. Conventional photolithography may be used in conjunction with any deposition technique, as would be understood by one skilled in the art upon reading the present disclosure. In some approaches, each fiducial may be formed concurrently with elements of the thin film structures.

In some approaches, the fiducials may be patterned regions of a material used for defining critical features of the thin film structure. For example, but not meant to be limiting, cobalt platinum hard bias magnet material may be used to form the fiducials. Hard bias magnet films may be 60 to 80 nm thick and thus easily profiled in an atomic force microscope (AFM). In some approaches, the fiducials may be profiled in a scanning electron microscope (SEM) during scanning of the module surface. Known optical techniques may be used to measure the span between reflective fiducials.

In some approaches, the fiducials of a module may include suitable material well known by one skilled in the art. For example, illustrative materials may include a combination of nickel and iron, an alloy of nickel and iron, permalloy, a combination of nickel and chromium, an alloy of nickel and chromium (e.g., nichrome), etc. The lapped media bearing surface is typically not perfectly planar, e.g., permalloy fiducials may protrude above or be recessed from the surrounding material, which may be alumina, to facilitate imaging. In some approaches, devices may be etched to accentuate the surface profile height differences for optimized imaging.

In some approaches, regions patterned by photolithography may be used for electroplating thicker fiducials at locations that may be determined by critical film features. Thicker fiducials may be imaged for determining location thereof by scanning the tape bearing surface using an AFM. In so doing, the dedicated fiducial is preferably distinguished by its topography relative to the proximate materials in the die.

FIGS. 11A-11C depict an apparatus 1100 having dedicated fiducials for enabling measurement of a span between the fiducials, in accordance with various embodiments. As an option, the present apparatus 1100 may be implemented in conjunction with fiducials from any other embodiment listed herein, such as those described with reference to the other FIGS. Of course, however, such apparatus 1100 and others presented herein may be used in various applications and/or in permutations which may or may not be specifically described in the illustrative embodiments listed herein. Further, the apparatus 1100 presented herein may be used in any desired environment.

The apparatus 1100 may include a module having a thin film structure having a plurality of elements exposed on a lapped surface of the thin film structure and at least two fiducials dedicated for enabling measurement therebetween where each fiducial may include two bars preferably aligned parallel to each other and a space defined therebetween. FIG. 11A is a schematic drawing of a lapped surface 1120 of a thin film structure 1122 prior to fabricating the structure into a module. As shown in FIG. 11A, the product 1100 may have a plurality of fiducials 1102a, 1102b, 1102c, 1102d, 1102e exposed on a lapped surface 1120 of the thin film structure 1122. Looking to fiducial 1102c, a fiducial 1102c may have two rectangle bars 1105, 1106 preferably aligned parallel to each other and a space 1104 defined therebetween. In addition, a reference line 1125 may be centered in the space 1104 between the two rectangle bars 1105, 1106 of the fiducial 1102c.

In some approaches, the space 1104 may have a width in a range of about 250 nanometers to about 3000 nanometers. Furthermore, the space 1104 may have a reference line 1125 oriented perpendicular to the lapped surface 1120. The width and/or thickness of the bars 1105, 1106 may be similar or the same to the widths and thicknesses described elsewhere herein.

In one embodiment, a fiducial having two bars aligned parallel to each other with a space therebetween may facilitate processing. For instance, the two rectangle bars 1105, 1106 of fiducial 1102c may be large, e.g., larger than desired for imaging. Thus, the reference line 1125 centered in the space 1104, where the space may be 250 nm to 3000 nm wide, results in greater precision in the image generated from the fiducial in the field of view 1127 of the imaging device (as illustrated in both in lapped surface view FIG. 11A and top down wafer view FIG. 11B).

FIG. 11C represents fiducials 1102a, 1102b following deposition when the wafer 1108 and overlying thin film structure are cut along 11C in FIG. 11B. In various approaches, as shown in FIG. 11C, the plated fiducials 1102a, 1102b may extend to the tape bearing surface 1124 and, thus may be lapped and polished. In some approaches, the plated fiducials 1102a, 1102b may be differentially etched to create a non-planar surface for AFM imaging. In preferred approaches, the fiducials 1102a, 1102b may have a width w in a range of about 500 nm to about 2000 nm wide, and a deposition thickness in a range of about 500 nm to about 2000 nm.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a ROM, an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer.

The inventive concepts disclosed herein have been presented by way of example to illustrate the myriad features thereof in a plurality of illustrative scenarios, embodiments, and/or implementations. It should be appreciated that the concepts generally disclosed are to be considered as modular, and may be implemented in any combination, permutation, or synthesis thereof. In addition, any modification, alteration, or equivalent of the presently disclosed features, functions, and concepts that would be appreciated by a person having ordinary skill in the art upon reading the instant descriptions should also be considered within the scope of this disclosure.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. An apparatus, comprising:
    a module having an array of transducers having at least two transducers; and
    a persistent memory having stored therein data of a span of the array of transducers at a particular temperature and data of a target span of an array of transducers at the particular temperature.

2. An apparatus as recited in claim 1, wherein the at least two transducers include servo readers, wherein the span is the distance between two servo readers.

3. An apparatus as recited in claim 2, wherein the span is measured between centerlines of the respective servo readers.

4. An apparatus as recited in claim 3, wherein the centerlines are geometric centerlines.

5. An apparatus as recited in claim 3, wherein the centerlines are magnetic centerlines.

6. An apparatus as recited in claim 1, wherein the span is the distance between distal data readers of the array of transducers.

7. An apparatus as recited in claim 1, wherein the span is the distance between outer data writers of the array of transducers.

8. An apparatus as recited in claim 7, wherein the span is measured between respective centerlines of the outer data writers.

9. An apparatus as recited in claim 7, wherein the span is measured between shingling edges of the outer data writers.

10. An apparatus as recited in claim 1, wherein the data includes a relative head span, the relative head span being the difference between the span of the array of transducers and the target span of the array of transducers at the particular temperature.

11. An apparatus as recited in claim 10, wherein the span of the array of transducers is a length between a first servo reader and a second servo reader in a direction parallel to the array of transducers.

12. An apparatus as recited in claim 10, wherein the target span is a reference value of a specification of the module.

13. An apparatus as recited in claim 10, wherein the target span is an average span derived from a plurality of modules.

14. An apparatus as recited in claim 13, wherein the average span comprises an average of measurements of physical spans of a plurality of modules at a known temperature.

15. An apparatus as recited in claim 13, wherein the average span is an average of a plurality of measurements of magnetic spans of a plurality of modules derived from reading magnetic recording media having known servo track span at a known temperature, humidity and tension.

16. An apparatus as recited in claim 13, wherein the target span is an average span derived from a plurality of modules comprising readers and no writers.

17. An apparatus as recited in claim 13, wherein the target span is an average span derived from a plurality of modules comprising writers and servo readers and no data readers.

18. An apparatus as recited in claim 1, wherein the module is a reader module; and further comprising a writer module, wherein a span of the writer module is stored in the persistent memory, wherein the span of the reader module is different from the span of the writer module.

19. An apparatus as recited in claim 1, comprising a second module, wherein a span of the second module is stored in the persistent memory, the module being used in a first tape travel direction, the second module being used in a second tape travel direction opposite the first tape travel direction, wherein the span of the module is different than the span of the second module.

20. An apparatus as recited in claim 1, further comprising:
    a drive mechanism for passing a magnetic medium over the array of transducers; and
    a controller electrically coupled to the array of transducers.

21. An apparatus, comprising:
    a plurality of modules, each module having an array of transducers having at least two transducers; and
    a persistent memory having stored therein data of spans of the arrays of transducers at a particular temperature and data of a target span of each array of transducers at the particular temperature.

22. An apparatus as recited in claim 21, wherein data of the spans is stored with vital product data (VPD).

23. An apparatus as recited in claim 21, wherein the spans are within a specified range.

24. An apparatus as recited in claim 21, wherein the spans are within 50 nm of a standard value.

25. An apparatus, comprising:
    a module having fiducials at known positions relative to an array of transducers; and
    a persistent memory having stored therein data of a span between the fiducials at a particular temperature and data of a target span between the fiducials at the particular temperature.

* * * * *